(12) United States Patent
Kim

(10) Patent No.: US 8,497,835 B2
(45) Date of Patent: Jul. 30, 2013

(54) ELECTRO PHORETIC DISPLAY DEVICE INCLUDING TOUCH PANEL

(75) Inventor: Sang-Soo Kim, Paju-si (KR)

(73) Assignee: LG Display Co. Ltd., Seoul (KR)

( * ) Notice: Subject to any disclaimer, the term of this patent is extended or adjusted under 35 U.S.C. 154(b) by 839 days.

(21) Appl. No.: 12/571,996

(22) Filed: Oct. 1, 2009

(65) Prior Publication Data

US 2010/0149089 A1   Jun. 17, 2010

(30) Foreign Application Priority Data

Dec. 17, 2008 (KR) ........................ 10-2008-0128452

(51) Int. Cl.
*G09G 3/34* (2006.01)

(52) U.S. Cl.
USPC ........... 345/107; 345/173; 345/175; 345/204; 178/18.09; 359/296

(58) Field of Classification Search
USPC ..... 345/107, 173, 175, 204; 257/72; 359/296; 178/18.09
See application file for complete search history.

(56) References Cited

U.S. PATENT DOCUMENTS

| | | | | |
|---|---|---|---|---|
| 2007/0131936 | A1* | 6/2007 | Kang et al. ........................ | 257/72 |
| 2007/0164953 | A1* | 7/2007 | Huang et al. .................... | 345/88 |
| 2008/0246739 | A1* | 10/2008 | Choi et al. ..................... | 345/173 |

FOREIGN PATENT DOCUMENTS

| | | |
|---|---|---|
| CN | 1801067 A | 7/2006 |
| CN | 1982960 A | 6/2007 |
| CN | 101281725 A | 10/2008 |
| JP | 2004-264846 | 9/2004 |
| JP | 2005-129948 | 5/2005 |
| JP | 2005-196177 | 7/2005 |
| JP | 2005-196737 | 7/2005 |
| JP | 2006-91708 | 4/2006 |
| JP | 2007-164127 | 6/2007 |
| JP | 2008-134600 | 6/2008 |
| KR | 1020050112878 A | 12/2005 |
| KR | 1020070063263 A | 6/2007 |

OTHER PUBLICATIONS

Office Action issued in corresponding Korean Patent Application No. 10-2008-0128452, mailed Nov. 12, 2012.

(Continued)

*Primary Examiner* — Lun-Yi Lao
*Assistant Examiner* — Sosina Abebe
(74) *Attorney, Agent, or Firm* — Brinks Hofer Gilson & Lione (57) ABSTRACT

Disclosed is an electro phoretic display (EPD) device capable of minimizing the whole thickness and weight by integrally including a photo-sensing touch panel and minimizing the number of lines such as a signal line. The EPD device includes first and second substrates facing each other, a plurality of gate lines, a plurality of common lines, and a driving voltage line formed on the first substrate in a first direction, an output line formed and a plurality of data lines defining pixel regions by crossing the gate lines in a second direction, pixel transistors formed at intersecting parts between the respective gate lines and the data lines, a pixel electrode formed at each pixel region, a sensing transistor formed between one of the common lines and the driving voltage line, an output transistor formed between one of the gate lines, adjacent to the sensing transistor, and the sensing transistor to transmit an output signal to the output line, a sensing capacitor formed between one of the common lines and a connection part between the sensing transistor and the output transistor, a common electrode formed over the entire surface of the second substrate, and an electro phoretic layer formed between the first and the second substrates.

6 Claims, 10 Drawing Sheets

OTHER PUBLICATIONS

Office Action issued in corresponding Japanese Patent Application No. 2009-274293, mailed May 7, 2012.

Office Action issued in corresponding Chinese Patent Application No. 200910140204.4, mailed Jul. 11, 2012.

Office Action issued in corresponding Chinese Patent Application No. 200910140204.4, mailed Oct. 9, 2011.

Office Action issued in corresponding Japanese Patent Application No. 2009-274293, mailed Nov. 29, 2012.

Office Action issued in corresponding Chinese Patent Application No. 200910140204.4, mailed Dec. 31, 2012.

* cited by examiner

ELECTRO PHORETIC DISPLAY DEVICE INCLUDING TOUCH PANEL

This application claims the benefit of Korea Patent Application No. 10-2008-0128452 filed on Dec. 17, 2008, the entire contents of which is incorporated herein by reference for all purposes as if fully set forth herein.

BACKGROUND

1. Field of the Invention

The present disclosure relates to an electro phoretic display device, and more particularly, to an electro phoretic display device capable of minimizing the whole thickness and weight by integrally including a photo-sensing touch panel and minimizing the number of lines such as a signal line.

2. Discussion of the Related Art

An electro phoretic display (EPD) device refers to a type of flat panel display used for an E-book, comprising a pair of indication plates each equipped with a field generating electrode, and a micro capsule disposed between the pair of indication plates, the micro capsule containing electric ink having white and black pigment particles respectively electrified to positive or negative potentials.

The EPD device applies voltage to the two facing electrodes so that a potential difference is caused between opposite ends of the electrodes, accordingly moving the black and white electrified pigment particles respectively to the electrodes having opposite polarities and thereby displaying an image.

Such an EPD device is advantageous because it displays an image naturally as if being printed on paper because it has high reflectivity and contrast ratio while being relatively less subject to a viewing angle. Also, the EPD device is capable of maintaining the image without continuous application of a voltage owing to the bistability of black and white, and therefore power consumption can be reduced. Furthermore, in contrast to an LCD, the EPD device does not need a polarizing plate, an alignment layer, and an LCD and so on, thus being advantageous in terms of price competitiveness.

A display device, including the EPD device, as used for some applications require a touch input to operate the device. Thus, a touch screen panel has been mounted on a display panel.

Generally, the touch screen panel may be divided into a resistance type, a capacitor type, and a photo-sensing type, depending on the operating system. These days, the display device is structured by mounting the touch screen panel on the display panel and accordingly is used as a combined display and input device.

However, when the touch screen panel is applied to the conventional EPD device, some problems are incurred as follows.

The EPD device is structured in such a manner that electric ink is interposed between two substrates having a pixel electrode and a facing electrode of the pixel electrode, respectively, and a voltage difference is generated between the pixel electrode and the facing electrode. Therefore, the EPD device operates as ions in the electric ink are moved to corresponding polarities by the voltage difference.

In order to dedicatedly attach the touch screen panel on the EPD device, the touch screen panel and the EPD device need to be separately formed and attached, thereby increasing the whole thickness and the number of processes.

Furthermore, the overlapped structure of the two panels would deteriorate transmittance as a display device.

BRIEF SUMMARY

An EPD device including a touch panel, comprises: first and second substrates facing each other, a plurality of gate lines, a plurality of common lines, and a driving voltage line formed on the first substrate in a first direction, an output line and a plurality of data lines defining pixel regions by crossing the gate lines, wherein the output line and the data lines are formed in a second direction crossing the first direction, pixel transistors formed at intersecting parts between the respective gate lines and the data lines, a pixel electrode formed at each pixel region, a sensing transistor formed between one of the common lines and the driving voltage line, an output transistor formed between one of the gate lines, adjacent to the sensing transistor, and the sensing transistor to transmit an output signal to the output line, a sensing capacitor formed between one of the common lines and a connection part between the sensing transistor and the output transistor, a common electrode formed over the entire surface of the second substrate, and an electro phoretic layer formed between the first and the second substrates.

In another aspect of the present invention, a method for manufacturing an EPD device including a touch panel, comprises: preparing first and second substrates facing each other; forming a plurality of gate lines, a plurality of common lines and a driving voltage line in a first direction, first and second gate electrodes protruded from the gate lines, and sensing gate electrodes protruded from the common lines on a first substrate; forming first and second semiconductor layers respectively overlapping with the first and the second gate electrodes, and a third semiconductor layer overlapping with the sensing gate electrode; forming a data line and an output line in a second direction crossing the first direction, a source electrode protruded from the data line and a drain electrode at an interval from the source electrode on the first semiconductor layer, an output drain electrode protruded from the output line and an output source electrode at an interval from the output drain electrode on the second semiconductor layer, and a sensing source electrode and a sensing drain electrode separated from and corresponded to each other on the third semiconductor layer; forming a pixel electrode on each pixel region disposed on intersecting parts between the gate lines and the data lines; forming a common electrode on the entire surface of the second substrate; and forming an electro phoretic layer between the first and the second substrates.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE DRAWINGS AND THE PRESENTLY PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
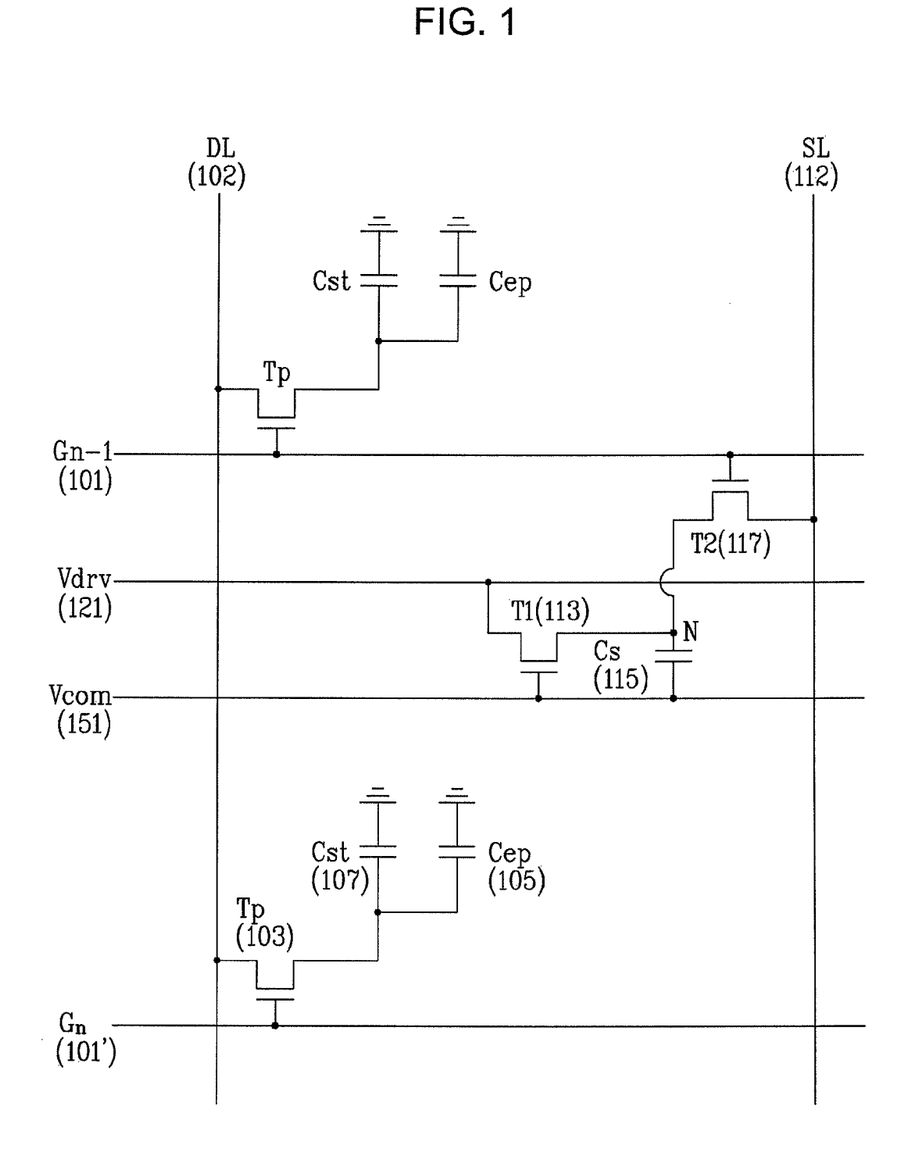
FIG. 1 is a circuit diagram illustrating an electro phoretic display (EPD) device according to an embodiment.

FIG. 1 is a circuit diagram of an electro phoretic display (EPD) device according to an embodiment of the present invention.

Although not shown, the EPD device comprises an EPD panel, a gate driving unit connected to the EPD panel, a data driving unit, a gray scale voltage generation unit connected to the data driving unit, a signal control unit controlling the above parts, and a photo-sensing unit detecting light varied according to a finger contact and the like and thereby determining the position.

In addition, the EPD device according to the embodiment comprises first and second substrates facing each other, and an electro phoretic layer (not shown) interposed between the first and the second substrates, including a micro capsule containing positive and negative ions, that is, opposite polarities.

The EPD panel in terms of an equivalent circuit as shown in FIG. 1 comprises pluralities of gate lines 101 (101') and data lines 102 defining pixel regions, and pixel transistors Tp formed at intersecting parts between the respective gate lines 101 and the data lines 102. Optionally, a photo-sensing unit (T1, Cs and T2) is further provided at every n-number of pixels (n: natural number). In addition, common lines 151 are further formed at a lower part of each gate line 101 parallel with the gate line 101.

The pixel transistor Tp is connected to an electro phoretic capacitor Cep formed between common electrodes (not shown) formed on the second substrate, and to a storage capacitor Cst formed between the pixel electrode and the common line 151. The pixel transistor Tp is applied with signals from the gate driving unit and the data driving unit through the gate line 101 and the data line 102.

The photo-sensing unit further comprises a driving voltage line Vdry 121 and an output line SL 112. Additionally, a sensing transistor T1 113 is formed between the driving voltage line Vdry 121 and the common line Vcom 151, an output transistor T2 117 is formed at a shear gate line Gn-1 101 and a drain terminal of the sensing transistor T1 113, and a sensing capacitor Cs 115 is formed between the drain terminal of the sensing transistor T1 113 and the common line Vcom 151.

Here, the drain terminal of the sensing transistor T1 113 is connected to one electrode of the sensing capacitor Cs 115 through a node N, and also connected to a source terminal of the output transistor T2 117.

That is, the photo-sensing unit is formed among the shear gate line 101, the driving voltage line 121 and the common line 151. Density of the photo-sensing unit can be adjusted as necessary. The photo-sensing unit is structured by unit equivalent to or smaller than (unit pixel*n) a minimum area touchable at any case. For example, the photo-sensing unit may be formed at every green pixel, or at every n-number of pixels (n: natural number).

The photo-sensing unit periodically commands output of photo-sensing signals through the shear gate line Gn-1 101, receives the photo-sensing signals accordingly output through the output line SL 112, processes the signals, and outputs corresponding data to a central control unit (not shown) so that new image signals can be supplied to the EPD device in accordance with the data.

More specifically, the sensing transistor T1 113 is a 3-terminal device, of which a gate terminal is connected to the common line 151, a source terminal is connected to the driving voltage line 121 and a drain terminal is connected to the node N.

The output transistor T2 117 is also a 3-terminal device, of which a gate terminal is connected to the shear gate line Gn-1 101, a source terminal is connected to the node N, and a drain terminal is connected to the output line SL 112.

In this case, when light is emitted to a channel unit semiconductor of the sensing transistor T1 113, the channel unit semiconductor comprising amorphous silicon forms a photo current. The photo current is flowed to the sensing capacitor Cs 115 and the output transistor T2 117 by the driving voltage Vdrv applied to the driving voltage line 121, and the sensing capacitor Cs 115 stores the current as a signal voltage. Here, an electrode on the other side of the sensing capacitor Cs 115 is applied with common voltage in connection with the common line 151, and maintains a constant common voltage such that the sensing transistor T1 113 can be operated only by light, not being influenced by surrounding voltages.

Here, the driving voltage line 121 is disposed parallel with the gate line 101. The driving voltage line 121 is formed of the same metal and disposed on the same layer as the gate line 101 and the common line 151 at certain distances from the gate line 101 and the common line 151. The output line 112 is formed of the same metal and on the same layer as the data line 102. The photo-sensing unit is formed throughout the shear gate line 101, the driving voltage line 121, and the common line 151 adjoining them. Here, since the common line 151 and the shear gate line 101 have not only the EPD function but also a photo sensing function, on and off states of the sensing transistor 113 and the output transistor 117 are controlled by the common line 151 and the shear gate line 101, respectively. Thus, the signal lines such as the gate line 101 and the common line 151 used for the EPD are also used for driving the photo-sensing unit. Therefore, at least two signal lines can be omitted from the EPD device, consequently improving the NA.

Hereinafter, the EPD device will be described in greater detail with reference to the drawings including plan views and sectional views.

Figure 2:
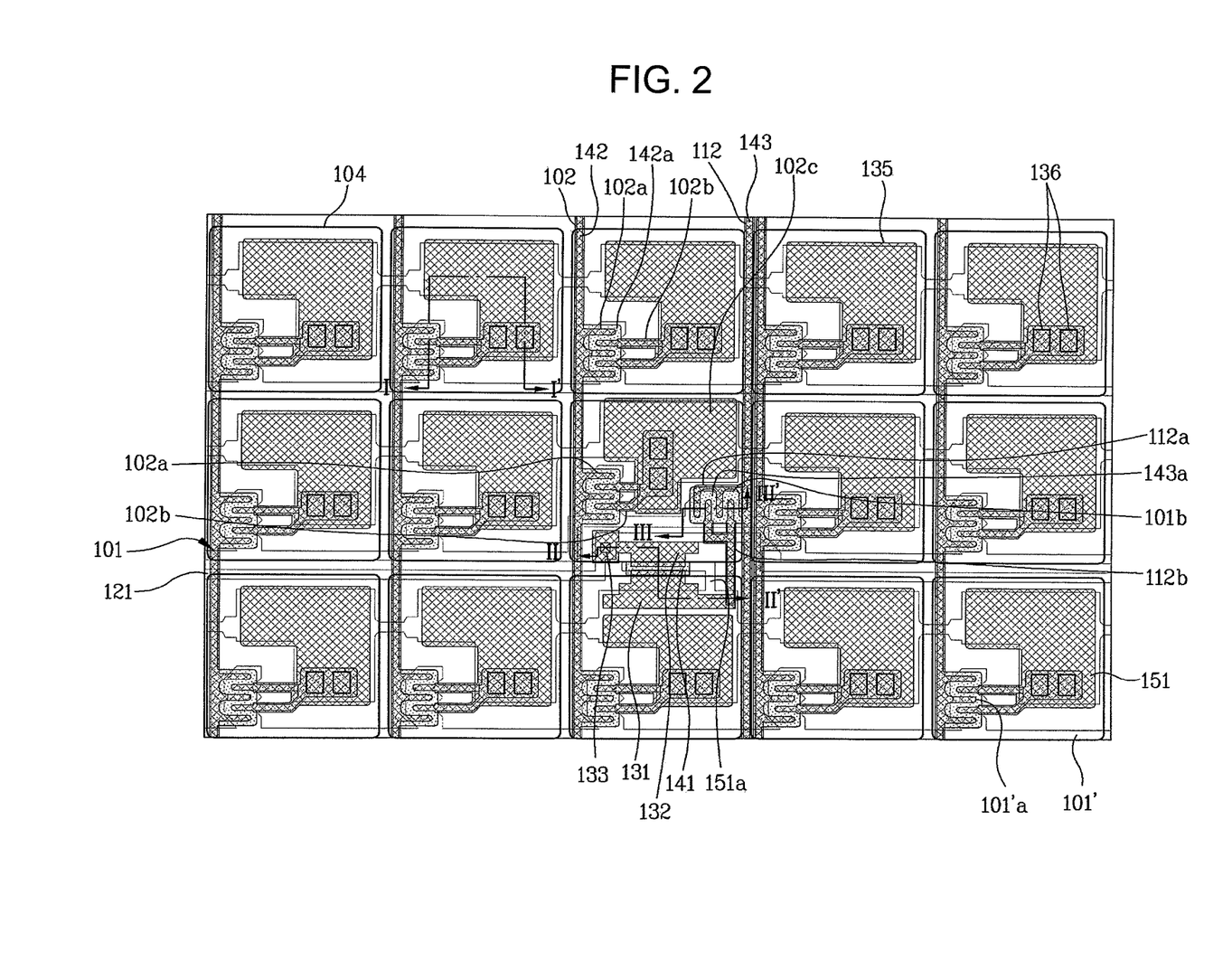
FIG. 2 is a plan view of the EPD device.
Figure 3:
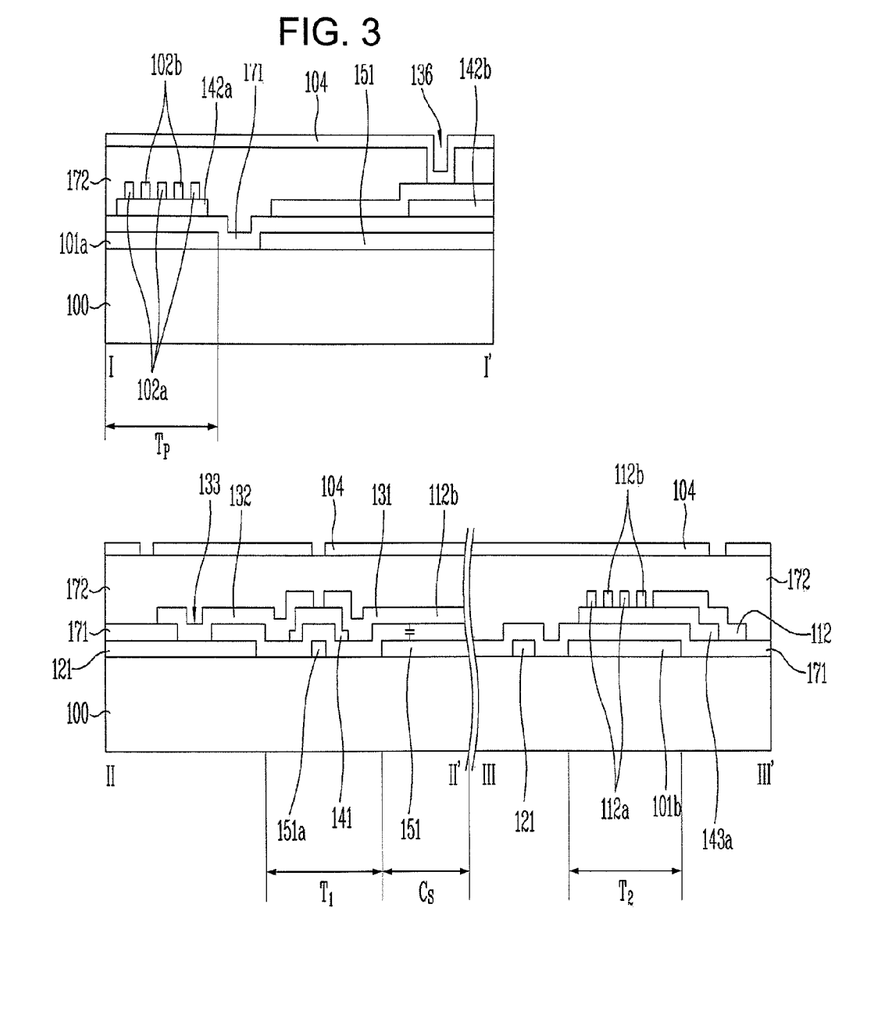
FIG. 3 are sectional views of a first substrate shown in FIG. 2, cut along lines I-I', II-II' and III-III'.

FIG. 2 is a plan view of the EPD device, and FIG. 3 is a sectional view of a first substrate shown in FIG. 2, cut along lines I-I', II-II' and III-III'.

Referring to FIG. 2 and FIG. 3, the EPD device according to the embodiment of the present invention comprises the pluralities of gate lines 101 and data lines 102 arranged on a first substrate 100, intersecting to define pixel regions, the pixel transistors Tp formed at the intersectional parts between the gate lines 101 and the data lines 102, the common lines 151 arranged parallel with the respective gate line 101 to pass through the pixel regions nearby, and the pixel electrodes 104 formed corresponding to the respective pixel regions. The common line 151 is formed of the same metal and on the same layer as the gate line 101 at a certain interval from the gate line 101.

As shown in FIG. 3 which is the sectional view cut along the line I-I', the pixel transistor Tp comprises a gate electrode 101a protruded from the gate line 101, a source electrode 102a protruded from the data line 102 to overlap the gate electrode 101a, a drain electrode 102b distanced from the source electrode 102a, and first semiconductor layers 142 (shown in FIG. 2) and 142a formed in contact with lower sides of the data line 101 and the source/drain electrodes 102a and 102b. A gate dielectric 171 is further formed on the first substrate 100 which includes the gate line 101 and the gate electrode 101a. A passivation layer 172 is further formed on the first substrate 100 which includes the data line 102 and the source/drain electrodes 102a and 102b. The pixel electrode 104 is formed on the passivation layer 172 of each pixel region separately from every other pixel electrode 104. The source electrode 102a has an E shape, and the drain electrode 102b also has an E shape in facing engagement with the E-shape source electrode 102a, being separated from the source electrode 102a. Since the source electrode 102a has the E shape, width and length of a channel between the source electrode 102a and the drain electrode 102b are increased, thereby improving the operation performance of the pixel transistor Tp.

As aforementioned, the photo-sensing units are formed optionally at every n-number of pixels. The output line 112 is further provided adjacently parallel with the right data line 102 of the corresponding pixel. In addition, the driving voltage line 121 is further provided adjacently parallel with the shear gate line Gn-1 and the common line 151.

The sensing transistor T1 and the sensing capacitor Cs of the photo-sensing unit are configured as shown in FIG. 2 and the II-II' line sectional view of FIG. 3.

First, the sensing transistor T1 comprises the sensing gate electrode 151a protruded from the common line 151, the gate dielectric 171 formed on the first substrate 100 to cover the sensing gate electrode 151a, a second semiconductor layer 141 forming an island and covering the sensing gate electrode 151a, and a sensing source electrode 132 and a sensing drain electrode 131 formed on both sides of the second semiconductor layer 141. Here, the sensing source electrode 132 having a layer form is electrically connected to the driving voltage line 121 disposed at the lower part thereof through a contact hole, and applied with the driving voltage signal Vdrv. That is, the source terminal of the sensing transistor Ts is connected with the driving voltage line 121.

With respect to the sectional surface, the sensing drain electrode 131 includes the gate dielectric 171 interposed at a lower part thereof such that the sensing capacitor Cs is formed between the sensing drain electrode 131 and the common line 151 disposed at the lower part. The sensing drain electrode 131 operates as the node N in the circuit shown in FIG. 1. The node N is connected with the sensing drain electrode 131 of the sensing transistor T1, the electrode formed on one side of the sensing capacitor Cs, and further with the source electrode of the output transistor T2.

Here, the sensing capacitor Cs is defined to include the sensing drain electrode 131 corresponding to the node N, the common line 151 formed at the lower part, and the gate dielectric 171 interposed between the sensing drain electrode 131 and the line electrode 151.

In addition, as shown in FIG. 2 and the line sectional view of FIG. 3, the output transistor T2 comprises the output gate electrode 101b protruded from the shear gate line Gn-1 101 to correspond to the photo-sensing unit, the gate dielectric 171 covering the output gate electrode 101b, a third semiconductor layer 143a forming an island covering the output gate electrode 101b, an output source electrode 112b overlapping with the third semiconductor layer 143a and having an E shape, and a drain electrode 112a protruded from the output line 112 and arranged in facing engagement with the E-shape output source electrode 112b, being separated from the output source electrode 102b.

At the node N, the output source electrode 112b and the sensing drain electrode 131 are integrally interconnected.

The passivation layer 172 is further formed over the entire surface of the first substrate 100 including the sensing transistor T1, the sensing capacitor Cs and the output transistor T2. The pixel electrode 104 is formed on the passivation layer 172 of each pixel region.

As shown in the drawings, the pixel electrode 104 may be in the form of a single layer comprising a reflective electrode or a double layer comprising a transparent electrode and a reflective electrode.

Hereinafter, the operation of the above structured photo-sensing unit will be explained.

The driving voltage, for example 10~15V, is applied to the source electrode of the sensing transistor T1 113 through driving voltage line 121. Additionally, a voltage of 0V is applied to gate electrode of the sensing transistor T1 113 through the common line 151. Therefore, when a predetermined light is sensed at the semiconductor layer of the sensing transistor T1, a path of a photo current is formed, flowing from the source electrode of the sensing T1 to the drain electrode through the channel, according to intensity of the sensed light. The photo current flows to the sensing capacitor Cs 115 through the drain electrode of the sensing transistor T1. According to this, the sensing capacitor Cs between the driving voltage line 121 and the common line 151 is electrified with electric charges by the photo current. Thus, the charges electrifying the sensing capacitor Cs are passed through the output transistor T2 and the output line 112, and amplified and read at a read-out IC (not shown) connected to the output line 112. Touch input is detected in accordance with the amplified photo current value.

In other words, touch input images can be sensed by the signals detected by the read-out IC in connection with the output line 112 varied according to the intensity of the light sensed by the sensing transistor T1. The sensed images may be transmitted to the control unit or implemented on a screen of the EPD panel according to a user's control.

Hereinafter, a manufacturing method for the EPD device will be explained.

FIG. 4A through FIG. 4F are plan views illustrating the manufacturing processes of the EPD device according to the embodiment of the present invention. Herein, the photo-sensing unit is formed at every "n" pixels ("n" is a natural number).

Figure 4A:
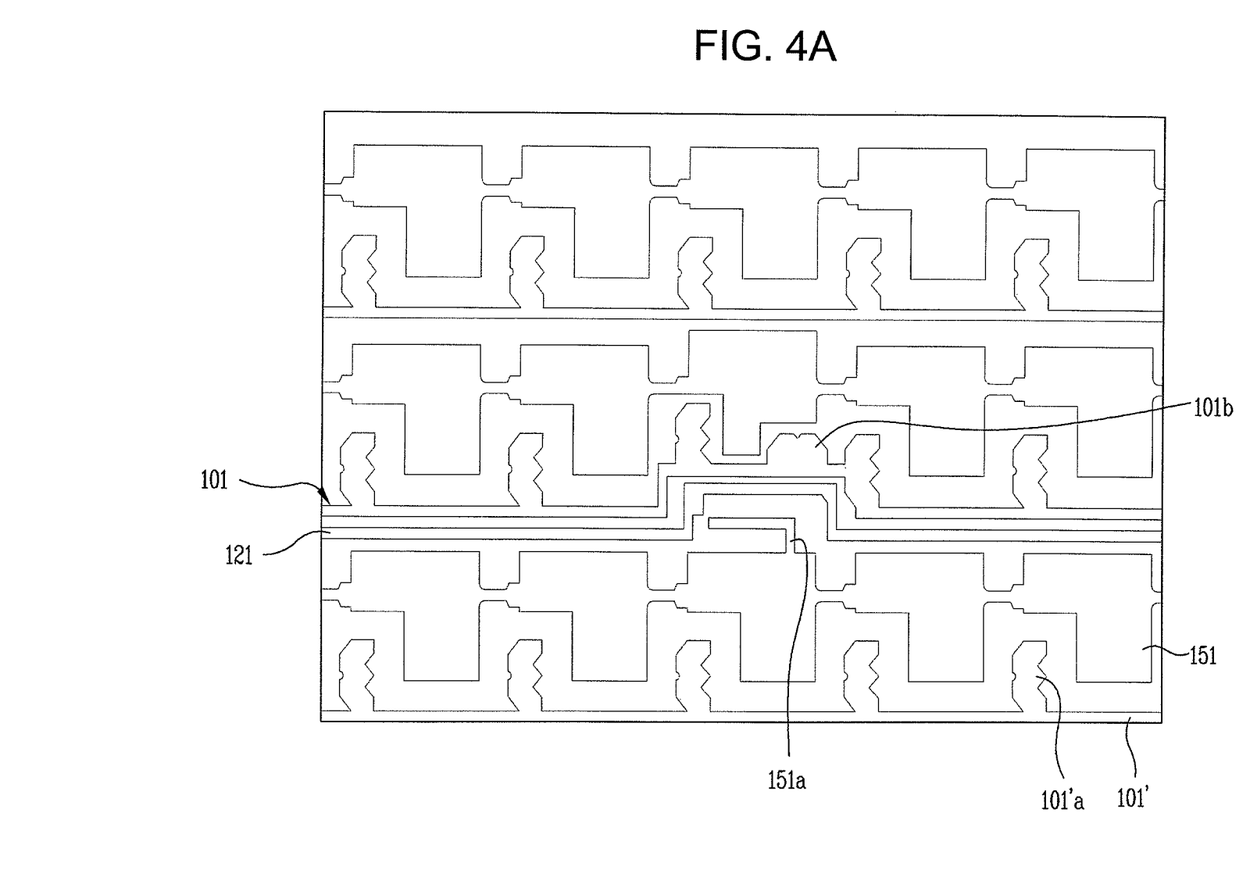
FIG. 4A through FIG. 4F are plan views showing the manufacturing processes of the EPD device.

As shown in FIG. 4A, a first metal is vapor-deposited on the first substrate 100 and then selectively removed, thereby forming the gate line 101 in a first direction including the gate electrodes 101a for each pixel. In addition, the common line 151 is formed in the first direction at an interval from the gate line 101. Simultaneously, the driving voltage line 121 is formed in the first direction at an upper part of the common line 151 to correspond to the photo-sensing unit. In addition, the EPD device further comprises the sensing gate electrode 151a protruded from the common line 151 toward the photo-sensing unit, and the output gate electrode 101b protruded along with the sensing gate electrode 101a from the shear gate line Gn-1 passing through the photo-sensing unit.

Next, the gate dielectric 171 (FIG. 3) is formed on the first substrate 100 including the gate line 101, the gate electrode 101a, the sensing gate electrode 151a, the driving voltage line 121, the common line 151 and the output gate electrode 101b.

Figure 4B:
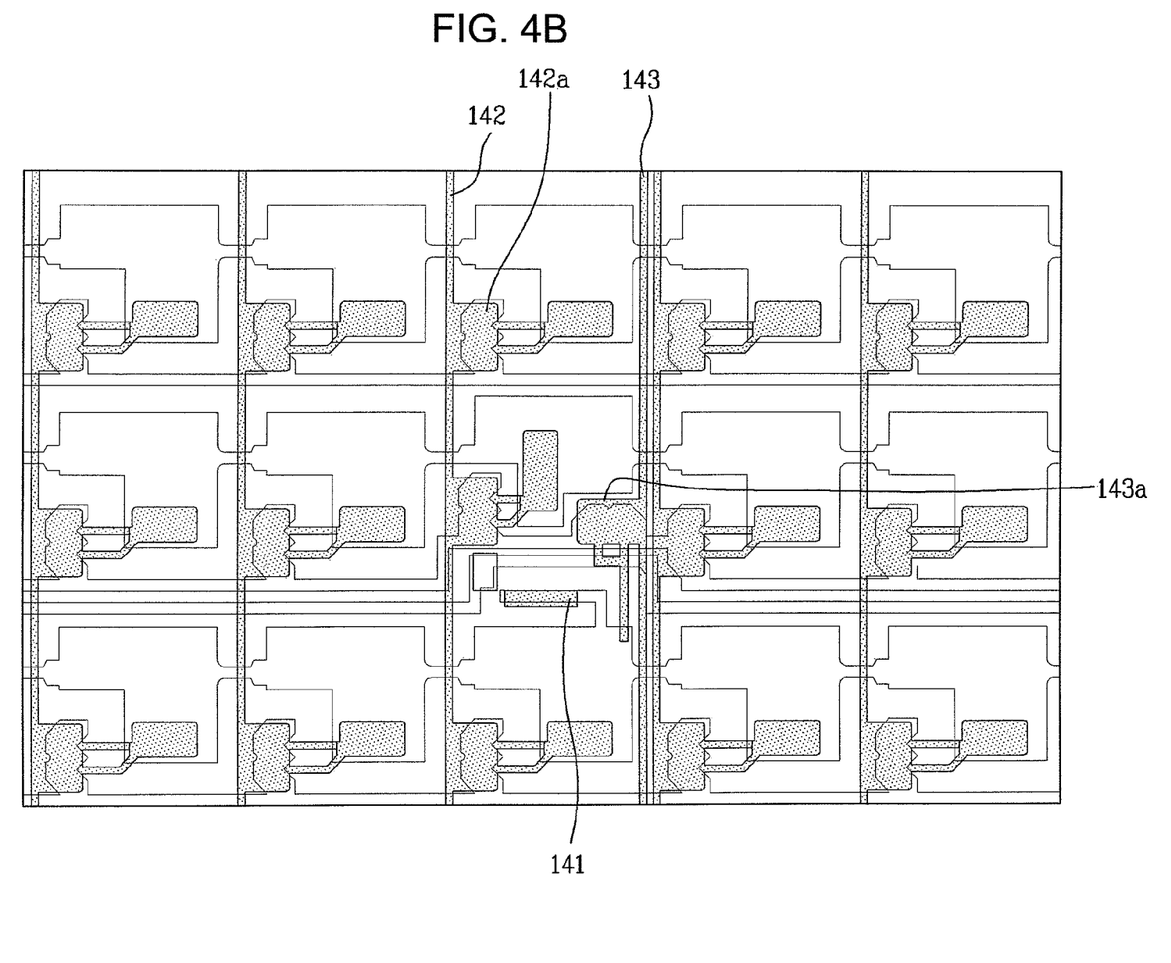

Afterward, as shown in FIG. 4B, a semiconductor layer is vapor-deposited on the upper part of the gate dielectric 171 (FIG. 3) and selectively patterned, accordingly forming semiconductor layers 142 and 143 in a second direction crossing the first direction to define the pixel region along with the gate line 101, and the first to the third semiconductor layers 142a, 141 and 143a respectively overlapping with the gate electrode 101a, the sensing gate electrode 151a and the output gate electrode 101b.

Figure 4C:
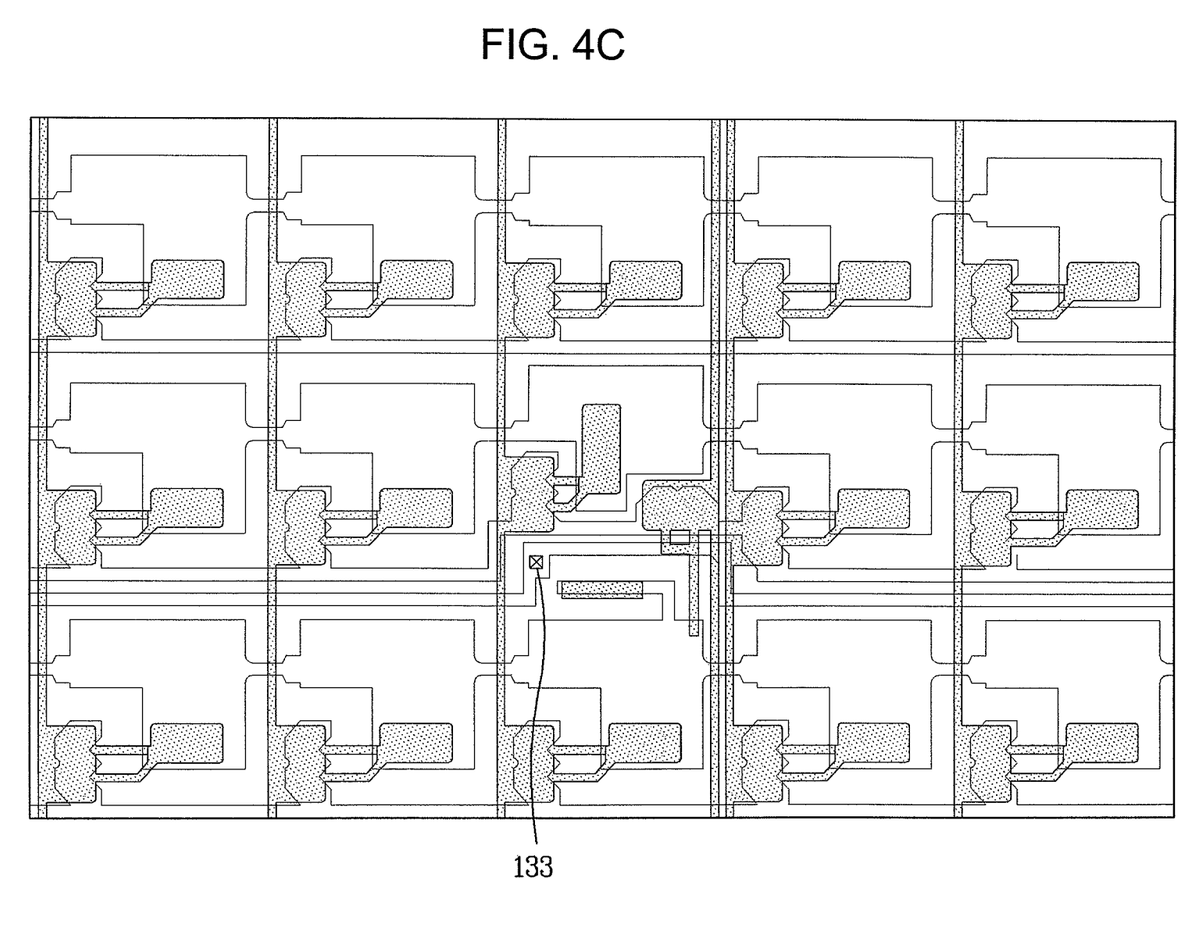

Referring to FIG. 4C, the gate dielectric 171 is selectively removed so that the driving voltage line 121 is partly exposed corresponding to the photo-sensing unit. Accordingly, a gate hole 133 is formed.

Figure 4D:
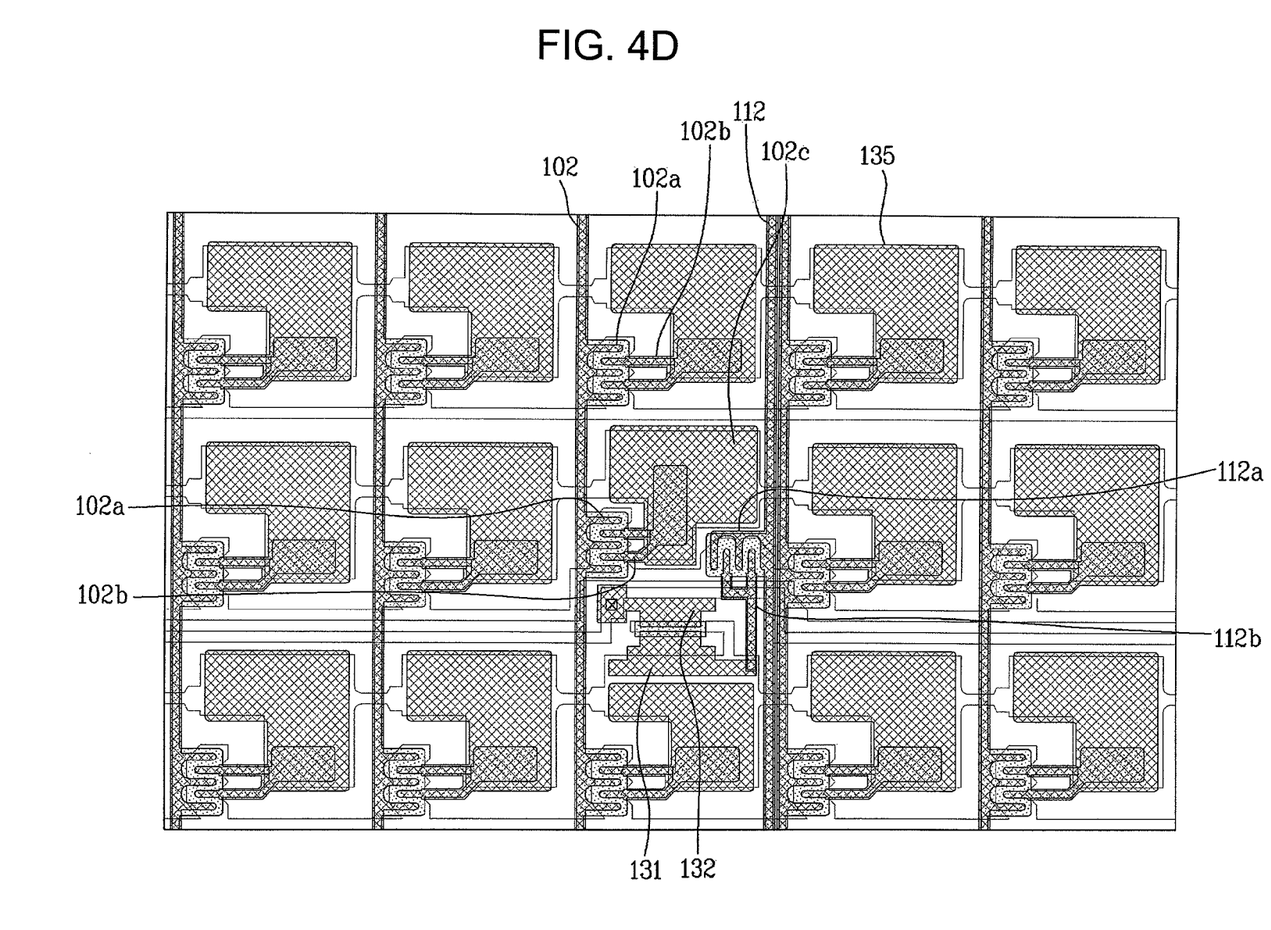

Next, as shown in FIG. 4D, a second metal is vapor-deposited on the gate dielectric 171 that includes the semiconductor layers 142 and 143 having the gate hole 133 and the first to third semiconductor layers 142a, 141 and 143a, and then overlapped on the semiconductor layers 142 and 143, thereby forming the data line 102 in the second line to define the pixel region by crossing the gate line 101, and also forming the output line 112 adjacent to the photo-sensing unit. The source electrode 102a overlaps the first to the third semiconductor layers 142a, 141 and 143a. Especially, the source electrode 102a is protruded between the respective pixels from the data line 102 so as to overlap the semiconductor layer pattern 142a. Furthermore, there are also provided the drain electrode 102b formed at an interval from the source electrode 102a, the output source electrode 112a protruded from the output line 112 to overlap with the semiconductor layer pattern 143a, the output drain electrode 112b formed at an interval from the output source electrode 112a, and the sensing source electrode 132 and the sensing drain electrode 131 formed on both sides of the semiconductor layer pattern 141.

Figure 4E:
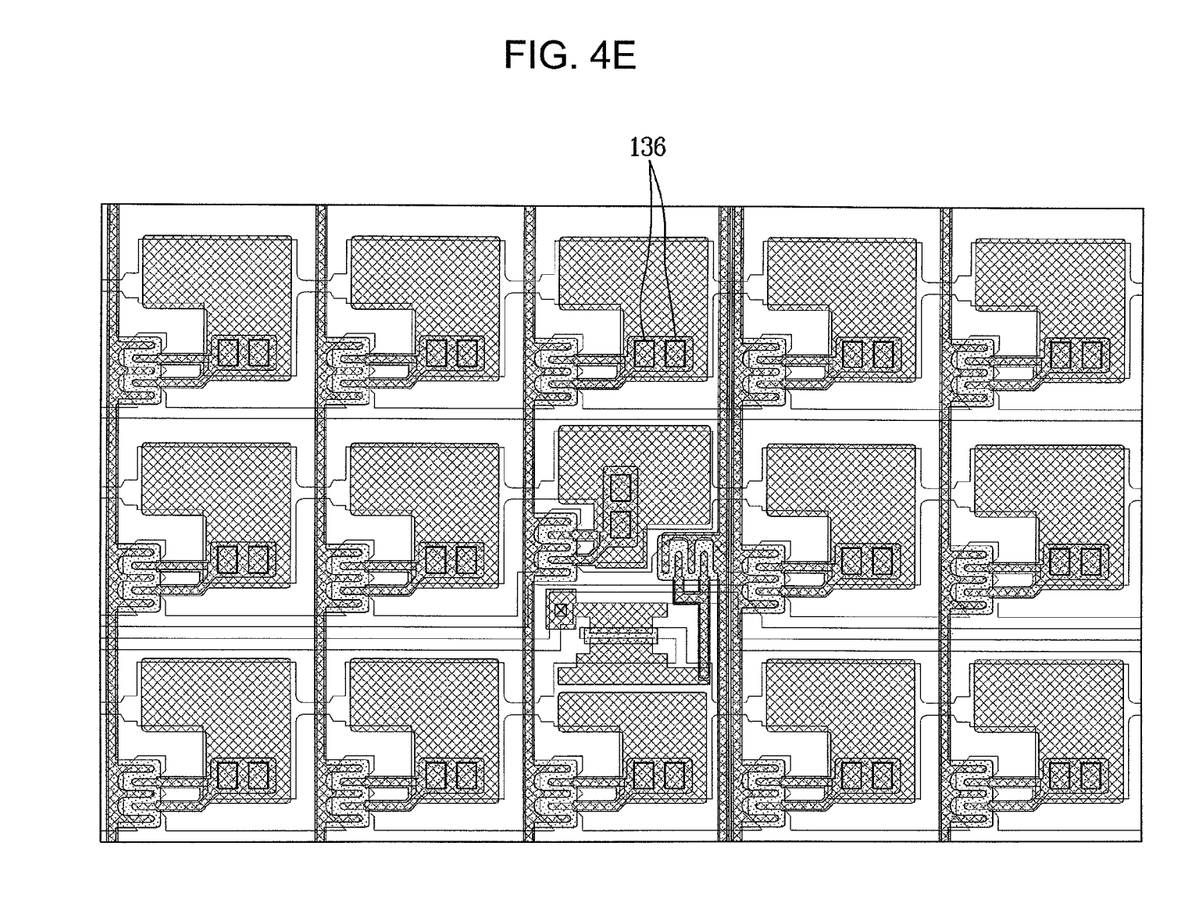

Next, as shown in FIG. 4E, the passivation layer 172 is formed on the entire surface of the gate dielectric 171 including the data line 102, the source electrode and the drain electrode 102a and 102b, the output source electrode 112a, the output drain electrode 112b and the source pattern and the drain pattern 131 and 132. After that, a contact hole 136 is formed to expose predetermined parts of the upper part of the drain electrode 102b.

Figure 4F:
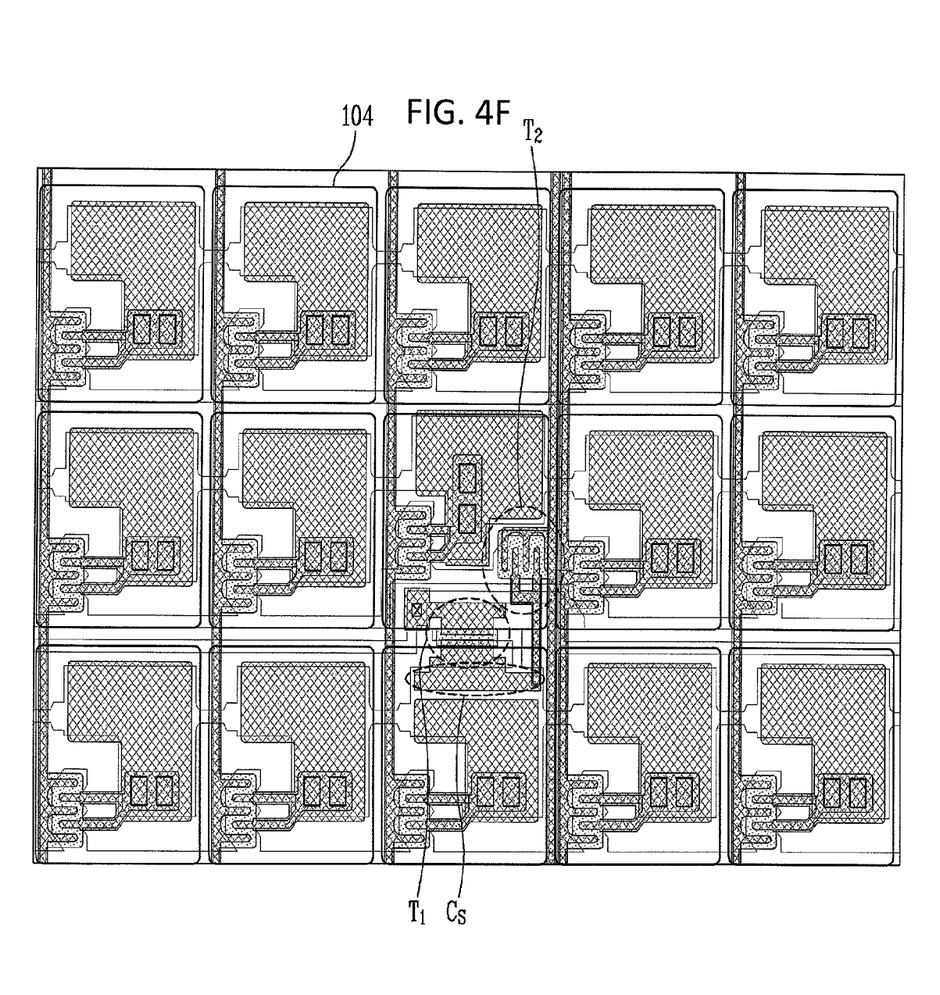

Referring to FIG. 4F, next, the pixel electrode is vapor-deposited on the entire surface including the contact hole 136 and then selectively removed so that the pixel electrodes are formed corresponding to the respective pixel regions. As described above, the pixel electrode 104 may be a double layer comprising a transparent electrode and a reflective electrode or a single layer comprising a reflective electrode. Therefore, light emitted by an electro-phoretic micro capsule (not shown) formed between the first substrate 100 and the second substrate (not shown) facing each other can be reflected from the pixel electrode 104 and output to the outside.

Hereinafter, the structure of the first substrate, that is, a lower substrate of the EPD device, and the second substrate facingly mounted to the first substrate will be explained in detail.

Figure 5:
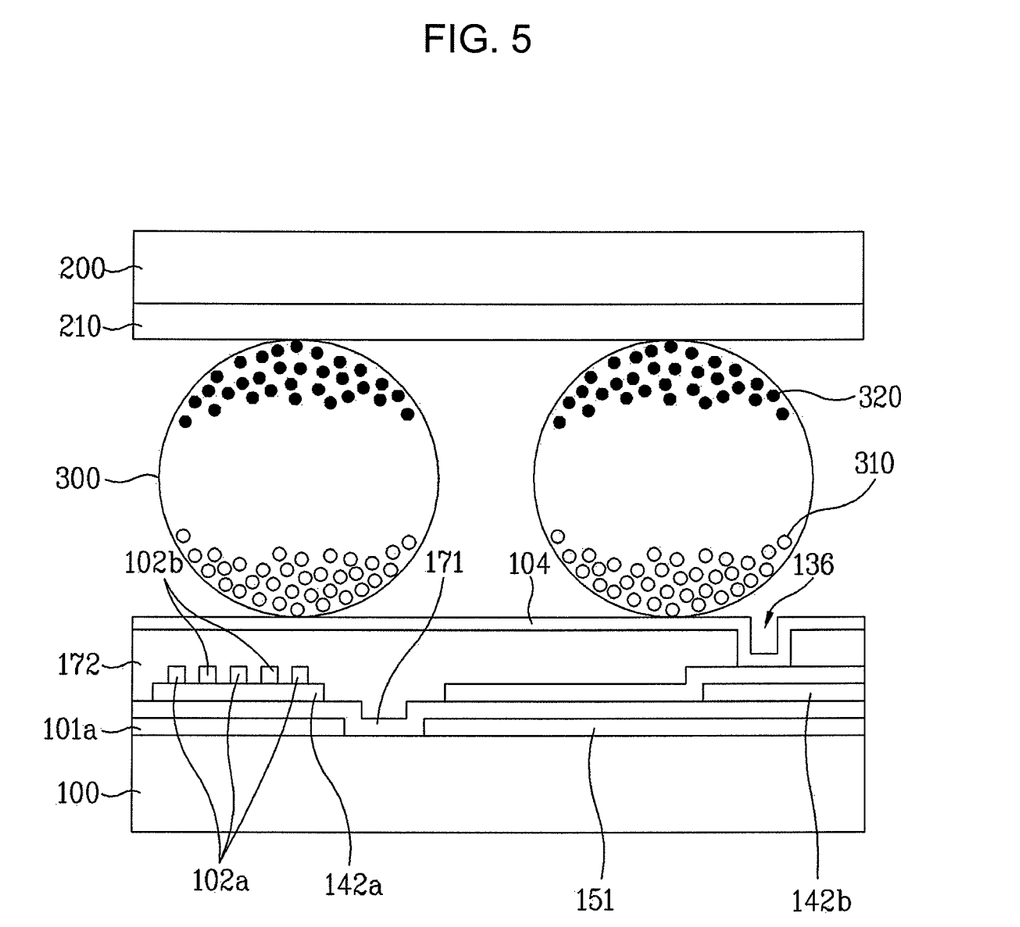
FIG. 5 is a sectional view of the EPD device shown in FIG. 2, cut along the line I-I'.

FIG. 5 is a sectional view of the EPD device, cut along the line I-I' of FIG. 2.

As shown in FIG. 5, the EPD device comprises the pixel transistor Tp formed on the first substrate 100 and the sensing capacitor Cs, the sensing transistor T1 and the output transistor T2 constituting the photo-sensing unit, which are explained above with FIG. 2 to FIG. 4F. In addition, the EPD device comprises a common electrode 210 formed through the entire surface of the second substrate 200 facing the first substrate 100. Also, an electro phoretic layer including the micro capsule 300 is formed between the pixel electrode 104 and the common electrode 210 of the first and the second substrates 100 and 200. As the electro phoretic layer is electrophoresed by voltage application, negative charges and positive charges in the micro capsule 300 can be separately arranged.

The electro phoretic layer comprises a plurality of the micro capsules 300, and a binder binding the micro capsules 300. Each of the micro capsules 300 contains white ink particles 310 electrified to negative (−) or positive (+) potential, black ink particles 320 electrified by the opposite potential to the white ink particles 310, and a transparent dielectric. For instance, if the white ink particles 310 are electrified to positive potential (+), the black ink particles 320 are electrified to negative potential (−).

As external light emitted from the outside is directly reflected by the white ink particles 310, a white image is displayed.

More specifically, as shown in the drawings, when a negative voltage (−) is applied to the pixel electrode 104 with respect to the common voltage Vcom applied to the common electrode 210, the white ink particles 310 having the positive charges are moved toward the first substrate 100 whereas the black ink particles 320 having the negative charges are moved toward the common electrode 210 of the second substrate 200. Accordingly, a black image is visualized.

On the other hand, when a positive voltage (+) is applied to the pixel electrode 104 with respect to the common voltage Vcom, the black ink particles 320 having the negative charges are moved toward the first substrate 100 whereas the white ink particles 310 having the positive charges are moved toward the second substrate 200. Accordingly, a white image is visualized.

As apparent from the above description, the EPD device according to any one of the above-described embodiment of the present invention has following advantages.

First of all, since a photo-sensing circuit unit functioning as a touch panel is formed on a substrate having a TFT, an in-cell type touch panel can be implemented in the EPD device.

Second, the photo-sensing circuit unit comprises a photo-sensing transistor, an output transistor detecting a signal corresponding to sensing by the photo-sensing transistor, and a sensing capacitor, while omitting two signal lines by utilizing part of signal lines connected to the photo-sensing transistor and the output transistor as a shear gate line and a common line. Such omission of the signal lines is effective in increasing NA, reducing weight of the device and simplifying the processes.

Third, since the signal lines are omitted and simplified as above, an installment space for the photo-sensing circuit unit can be secured even when implementing a high definition EPD device. Accordingly, the in-cell type touch recognition can be achieved in the high definition EPD device.

Fourth, the photo-sensing circuit unit is disposed at an overlapping position between the shear gate line and the common line so that a power line for driving the sensing transistor lies parallel with the gate line. Thus, non-operational areas generated at connection parts of the signal lines are minimized, thereby preventing deterioration of NA and image quality.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. An electro phoretic display (EPD) device including a touch panel, comprising:
   first and second substrates facing each other;
   a plurality of gate lines, a plurality of common lines, and a driving voltage line on the first substrate in a first direction;
   an output line and a plurality of data lines defining pixel regions by crossing the gate lines, wherein the output line and the data lines are in a second direction crossing the first direction;
   pixel transistors formed at intersecting parts between the respective gate lines and the data lines;
   a pixel electrode at each pixel region, wherein the pixel electrode includes a single layer comprising a reflective electrode;
   a sensing transistor between one of the common lines and the driving voltage line;
   an output transistor between one of the gate lines, adjacent to the sensing transistor, and the sensing transistor to transmit an output signal to the output line;
   a sensing capacitor between one of the common lines and a connection part between the sensing transistor and the output transistor;
   a common electrode over the entire surface of the second substrate; and
   an electro phoretic layer between the first and the second substrates,
   wherein the common lines are overlapped with the pixel electrode at pixel regions.

2. The EPD device according to claim 1, wherein a gate electrode of the sensing transistor is connected to one of the common lines while a source electrode of the sensing transistor is connected to the driving voltage line, and
   a gate electrode of the output transistor is connected to the one gate line adjacent to the sensing transistor, a source electrode of the output transistor is connected to a drain electrode of the sensing transistor, and a drain electrode of the output transistor is connected to the output line.

3. The EPD device according to claim 2, wherein the gate line, the common line and the driving voltage line are formed of the same metal and on the same layer at certain intervals from one another.

4. The EPD device according to claim 3, further comprising:
   a gate dielectric between a layer including the gate line, the common line and the driving voltage line and a layer including the data line and a output line, and
   a passivation layer between the layer including the data line and the output line and a layer including the pixel electrode.

5. The EPD device according to claim 4, wherein the driving voltage line and the source electrode of the sensing transistor are electrically connected through a gate contact hole in the gate dielectric.

6. The EPD device according to claim 3, wherein the output line is formed of the same metal and on the same layer as the data line at an interval from the data line.

* * * * *